2,979,508

HETEROCYCLIC DERIVATIVES OF 1-PHENYL-ω-(PIPERAZINE)ALKANOLS

Paul A. J. Janssen, Antwerpse Steenweg 16, Vosselaar, near Turnhout, Belgium

No Drawing. Filed Oct. 12, 1959, Ser. No. 845,628

8 Claims. (Cl. 260—268)

The present invention relates to a new group of heterocyclic alcohols and more particularly to 1-phenyl-ω-(4-heterocyclylpiperazine)alkanols of the general structural formula

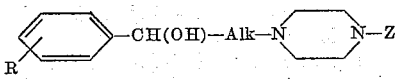

and the pharmaceutically acceptable non-toxic salts thereof wherein Z is a member of the group consisting of pyridyl, pyrimidyl, methylpyrimidyl, and methylpyridyl radicals; R is a member of the group consisting of hydrogen, methyl, methoxy, and fluoro radicals, and Alk is alkylene radical.

The radical Alk is a lower alkylene radical such as methylene, ethylene, propylene, butylene, trimethylene, tetramethylene, pentamethylene and hexamethylene. Radicals of 3–4 carbon atoms are preferred.

A preferred process for the preparation of these compounds employs the reduction of a ketone of the structural formula

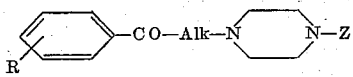

wherein Alk, R, and Z are defined as above with a metal hydride of the type (Alkali metal)MH₄ in which M is an element of periodic group III of an atomic number less than 14.

Another useful procedure for the preparation of these compounds employs the alkaline hydrolysis (for example, using sodium hydroxide) of a compound of the structural formula

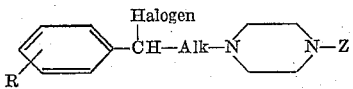

wherein Alk, R, and Z are defined as above. The hydrohalide salt is formed by the addition of 2 molecular equivalents of a hydrogen halide to the corresponding benzylidene compound.

The compounds can also be prepared by the condensation of a compound of the general formula

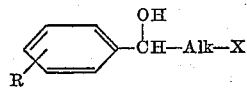

with a compound of the general structural formula

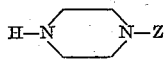

In this reaction Alk, R, and Z are defined as above and X as a readily replaceable electro-negative group, e.g. halogen, and arylsulfonoxy group or an alkylsulfonoxy group.

The compounds of this invention are central nervous system depressants. They augment the hypnotic effect of barbiturates. The compounds are also analgesics.

The organic bases of this invention form pharmaceutically useful non-toxic salts with a variety of inorganic and strong organic acids including sulfuric, phosphoric, hydrochloric, hydrobromic, hydriodic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfonate, methyl benzenesulfonate, ethyl toluenesulfonate, ethylene chlorohydrin, allyl bromide, methallyl bromide, and crotyl bromide.

The compounds which constitute this invention and the methods for their preparation will appear more fully from a consideration of the following examples which are given for the purpose of illustration only and are not to be construed as limiting the invention in spirit or in scope. In these examples quantities are indicated as parts by weight, temperatures are expressed in degrees centigrade (° C.), and pressures are expressed in millimeters of mercury (mm.).

Example 1

To 8.4 parts of β-chloropropiophenone in 600 parts of benzene are added gradually 21 parts of 1-(2-pyridyl)-piperazine in 200 parts of benezene and with constant stirring over a four hour period. The stirring is continued for another four hours and the precipitate is removed. The filtrate is washed with 250 parts of water and then evaporated to yield an oil. This is taken up in 400 parts of 2-propanol. Hydrogen chloride gas is passed through the solution and the precipitate formed is collected and recrystallized repeatedly from 500 parts of 2-propanol and 240 parts of methanol. The melting point of the white amorphous powder of 1-(β-benzoylethyl)-4-(2-pyridyl)piperazine dihydrochloride is about 214–215° C.

A solution of 7 parts of the dihydrochloride of 1-(β-benzoylethyl)-4-(2-pyridyl)piperazine in 1,000 parts of water is made alkaline and extracted with ether. The extract is dried over potassium carbonate, filtered and the solvent is evaporated. The solid residue is then dissolved in 80 parts of absolute ethanol, and 0.3 part of sodium borohydride is added portionwise at 35° C. The stirring is continued at that temperature for 3 hours. After decomposition with 64 parts of 2-N hydrochloric acid, the mixture is diluted with 200 parts of water, made alkaline with 20% sodium hydroxide, and diluted again to a total volume of 1,000 parts. By chilling at 0° C. a precipitate is formed which is filtered and then recrystallized from a solution of ether and acetone by chilling at 0° C. to yield the white amorphous powder of 1-phenyl-3-[4-(2-pyridyl)-piperazine]-1-propanol melting at about 97–98.2° C. It has the structural formula

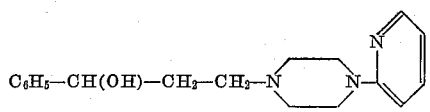

Example 2

A mixture of 5.1 parts of γ-chlorobutyrophenone and 10 parts of 1-(2-pyridyl)piperazine is heated for 50 hours on an oil bath at 115° C. The mixture is then treated with 100 parts of water and extracted with ether. This extraction is dried over magnesium sulfate, filtered and evaporated to yield 1-(γ-benzoylpropyl)-4-(2-pyridyl)- piperazine as a pale brown amorphous powder, melting at about 63–64.8° C.

To a solution of 4 parts of 1-(γ-benzoylpropyl)-4-(2-pyridyl)piperazine in 160 parts of absolute ethanol, is added 0.03 part of sodium borohydride portionwise at 35° C. The mixture is allowed to stand for 2 hours at 35° C., cooled to 20° C., and decomposed with 160 parts of 2-N hydrochloric acid. After dilution with 1500 parts of water the mixture is made alkaline. The precipitate formed upon chilling for 4 hours at 0° C. is filtered and recrystallized from diisopropyl ether by chilling at —20° C. to yield the white granular powder of 1-phenyl-4-[4-(2-pyridyl)piperazine]-1-butanol melting at about 113.8–114.8° C.

*Example 3*

A mixture of 86.4 parts of 2-bromo-4-methylpyridine, 85 parts of anhydrous piperazine, 53 parts of sodium carbonate, and 120 parts of pentanol is stirred and refluxed for five hours with continual removal of the water formed. The mixture is filtered and the filter-cake washed with butanol. The combined filtrate and washings are concentrated under reduced pressure. The oily residue, 1-(4-methyl-2-pyridyl)piperazine, is distilled under vacuum and the fraction boiling at 161–163° C. at a pressure of 8 mm. is collected.

A mixture of 4.55 parts of β-chloropropiophenone and 8.9 parts of 1-(4-methyl-2-pyridyl)piperazine is heated on an oil bath at 115° C. for 8 hours. The mixture is then refluxed with 120 parts of diisopropyl ether and the solid is collected. The precipitate is collected, and dried under vacuum to give 1-(β-benzoylethyl)-4-(4-methyl-2-pyridyl)piperazine.

From its dihydrochloride the free base of 1-(β-benzoylethyl)-4-(4-methyl-2-pyridyl)piperazine is liberated by dissolving 5 parts of the salt in 1000 parts of water, making the solution alkaline, extracting with ether, drying the extract over potassium carbonate, filtering, and evaporating the solvent to yield a solid residue. This base is then dissolved in 120 parts of absolute ethanol at 35° C. To this solution is added 0.6 part of sodium borohydride portionwise. The stirring is continued at about 30° C. for 2 hours. After cooling to 20° C. the mixture is decomposed with 40 parts of 2-N hydrochloric acid, diluted with 600 parts of water, and made alkaline with sodium hydroxide. After cooling at 0° C. for 8 hours, the precipitate formed is filtered, and recrystallized from diisopropyl ether by chilling at —20° C. to yield the white amorphous powder of 1-phenyl-3-[4-(4-methyl-2-pyridyl)piperazine]-1-propanol melting at about 81.6–83° C.

*Example 4*

After standing for six hours at 25° C., a mixture of 7.2 parts of β-chloro-4-fluoropropiophenone and 14 parts of 1-(4-methyl-2-pyridyl)piperazine is refluxed in 400 parts of ether, filtered, the filtrate is evaporated under vacuum, and the residue dissolved in ether. After dilution with 450 parts of acetone, hydrogen chloride gas passed through the solution and after standing at 25° C. for two hours, a precipitate is collected. Upon drying, the pale-yellow granular powder of 1-[β-(4-fluorobenzoyl)ethyl]-4-(4-methyl-2-pyridyl)piperazine hydrochloride melts at about 216.5–219.5° C.

By substituting 6 parts of 1-[β-(4-fluorobenzoyl)ethyl]-4-(4-methyl-2-pyridyl)piperazine dihydrochloride for 5 parts of 1-(β-benzoylethyl)-4-(4-methyl-2-pyridyl)-piperazine dihydrochloride in the paragraph 3, Example 3, the white granular crystals of 1-(4-fluorophenyl)-3-[4-(4-methyl - 2 - pyridyl)piperazine]-1-propanol melting at about 84–85° C. are obtained. It has the structural formula

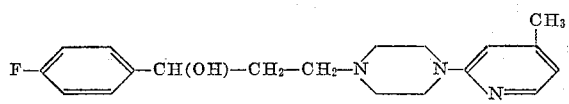

*Example 5*

To 5.6 parts of β-chloro-4-fluoropropiophenone are added 10 parts of 1-(2-pyridyl)piperazine with cooling. The mixture is extracted with boiling ether and the extract is washed with water, dried over sodium sulfate, and evaporated to a solid residue. After recrystallization from ether and drying, the pale yellow transparent crystals of 1-[β-(4-fluorobenzoyl)ethyl] - 4 - (2-pyridyl)-piperazine are obtained, melting at about 80.5–81.5° C.

To a solution of 4 parts of 1-[β-(4-fluorobenzoyl)ethyl]-4-(2-pyridyl)piperazine in 72 parts of absolute ethanol at 40° C., is added 0.3 part of sodium borohydride portionwise with stirring. The stirring is continued for 2 hours at 35–40° C. The mixture is decomposed with 72 parts of 2-N hydrochloric acid while cooling on a water bath, made alkaline with 20% sodium hydroxide, and diluted to a total volume of 1000 parts. By cooling to 0° C., a precipitate is formed which is filtered and dissolved in diisopropyl ether. The solution is dried over potassium carbonate and filtered again. The solvent is evaporated to ¼ of its original volume and the mixture is chilled at —15° C. for 8 hours. The precipitate which forms is filtered and dried to yield the white granular powder of 1-(4-fluorophenyl)-3-[4-(2-pyridyl)piperazine]-1-propanol melting at about 107.6–109.2° C.

*Example 6*

A mixture of 6 parts of γ-chloro-4-fluorobutyrophenone and 10 parts of 1-(2-pyridyl)piperazine is heated for fifty hours on an oil bath at 115° C. and then treated with 100 parts of water and 50 parts of ether. The combined ether layers are dried over magnesium sulfate and filtered. Petroleum ether is added to turbidity and the mixture is kept at —15° C. to yield 1-[γ-(4-fluorobenzoyl)propyl]-4-(2-pyridyl)piperazine which melts at 73–75° C.

Substitution of 6.4 parts of γ-chloro-4-methoxybutyrophenone for γ-chloro-4-fluorobutyrophenone in the above procedure yields 1-[γ-(4-methoxybenzoyl)propyl]-4-(2-pyridyl)piperazine which melts at about 75–75.5° C.

To a solution of 4 parts of 1-[γ-(4-fluorobenzoyl)propyl]-4-(2-pyridyl)piperazine in 40 parts of absolute ethanol and 120 parts of 2-propanol, 0.2 part of sodium borohydride is added at 30° C. with stirring. The stirring is continued for 150 minutes at this temperature. The mixture is decomposed by the portionwise addition of 80 parts of 2-N hydrochloric acid, cooled, made alkaline with 5% sodium hydroxide, and cooled to 0° C. The precipitate formed is filtered and dissolved in acetone. The solution is decolorized with activated charcoal, concentrated to about ½ of its original volume, diluted with about 50 parts of water, and chilled at 0° C. for 48 hours. The precipitate formed is filtered and dried to yield 1-(4-fluorophenyl)-4-[4-(2-pyridyl)piperazine]-1 - butanol. The white needles of this compound melt at about 104–105° C.

*Example 7*

A mixture of 5.1 parts of γ-chlorobutyrophenone and 10 parts of 1-(2-pyridyl)piperazine is heated for 50 hours on an oil bath at 115° C. The mixture is then treated with 100 parts of water and extracted with ether. This extraction is dried over magnesium sulfate, filtered and evaporated to yield 1-(γ-benzoylpropyl)-4-(2-pyridyl)piperazine as a pale brown amorphous powder, melting at about 63–64.8° C.

By substituting 5.9 parts of γ-chloro-4-methylbutyrophenone for 5.1 parts of γ-chlorobutyrophenone in the above procedure, an amorphous powder melting at about 92–93° C. of 1-[γ-(4-methylbenzoyl)propyl] - 4 - (2-pyridyl)piperazine is collected.

By substituting 7.2 parts of γ-chloro-3,4-dimethoxybutyrophenone for 5.1 parts of γ-chlorobutyrophenone in the first paragraph of this example and after recrystallizing from acetone, the small crystals of 1-[γ-(3,4-dimethoxybenzoyl)propyl]-4-(2-pyridyl)piperazine can be obtained. This compound melts at about 104.5–106.9° C.

To a solution of 3 parts of 1-[γ-(4-methylbenzoyl)propyl]-4-(2-pyridyl)piperazine in 130 parts of absolute ethanol is added 0.03 part of sodium borohydride portionwise at 30° C. The mixture is kept for 2 hours at 35° C., evaporated to about 50 parts under vacuum, and cooled to 20° C. After decomposition with 80 parts of 2-N hydrochloric acid and dilution with 800 parts of water, the mixture is made alkaline with 5% sodium hydroxide. By allowing the mixture to cool at 0° C. for 8 hours, a precipitate is formed which is filtered and dissolved in diisopropyl ether. After chilling to —20° C. a precipitate forms which is filtered, dried under vacuum, and recrystallized again from diisopropyl ether to yield 1-(4-methylphenyl)-4-[4 - (2 - pyridyl)piperazine] - 1-butanol. The white crystalline powder of this compound melts at about 119.2–119.8° C. The compound has the structural formula

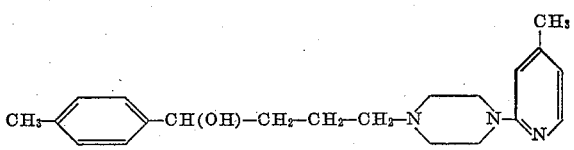

*Example 8*

A mixture of 7.7 parts of β-chloro-4-methoxypropiophenone and 13 parts of 1-(2-pyridyl)piperazine is refluxed with 320 parts of ether for 2 hours and then filtered. The filtrate is washed with 300 parts of water, dried over potassium carbonate, and evaporated under vacuum. The solid residue is boiled in 80 parts of diisopropyl ether to effect a solution. After chilling, the precipitate is filtered and dried under vacuum to yield 1-[β - (4 - methoxybenzoyl)ethyl]-4-(2-pyridyl)piperazine. The pale yellow granular powder of this compound melts at about 60–61° C. The structural formula of this compound is

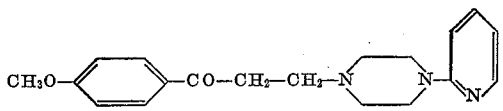

To a solution of 4 parts of 1-[β-(4-methoxybenzoyl)ethyl]-4-(2-pyridyl)piperazine in 120 parts of absolute ethanol, is added 0.6 part of sodium borohydride portionwise at 30° C. Stirring is continued at about 30° C. for 2 hours. After cooling to 20° C., the mixture is decomposed with 40 parts of 2-N hydrochloric acid, diluted with 600 parts of water and made alkaline with sodium hydroxide. By chilling for 8 hours at 0° C., a precipitate is formed which is filtered and recrystallized from diisopropyl ether by chilling at —20° C. to yield the white granular powder of 1-(4-methoxyphenyl)-3-[4-(2-pyridyl)piperazine]-1-propanol melting at about 89–90° C.

By substituting 5 parts of 1-[β-(4-methoxybenzoyl)ethyl]-4-(4-methyl-2-pyrimidyl)piperazine for 4 parts of 1-[β-(4-methoxybenzoyl)ethyl]-4-(2-pyridyl) - piperazine and 0.4 part for 0.6 part of sodium borohydride in the preceeding paragraph of this example, the white needles of 1-(4-methoxyphenyl)-3-[4-(4-methyl-2-pyridyl)-piperazine]-1-propanol melting at about 80.5–81.5° C. are obtained. The compound has the structural formula

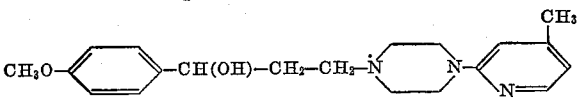

*Example 9*

A mixture of 5.45 parts of γ-chlorobutyrophenone and 9.9 parts of 1-(2-pyrimidyl)piperazine is heated at 110° C. for 5 hours. After cooling the mixture is treated with water and ether and the layers are separated. The water layer is extracted once more with ether. The ether layers are combined, dried over sodium sulfate, and filtered. The filtrate is cooled at —20° C. to yield 1-(γ-benzoylpropyl)-4-(2-pyrimidyl)piperazine. The pale yellow powder of this compound melts at about 78–79° C.

To a solution of 2.5 parts of 1-(γ-benzoylpropyl)-4-(2- pyrimidyl)piperazine in 80 parts of absolute ethanol, 0.2 part of sodium borohydride is added portionwise and with stirring at 30° C. Stirring is continued for 3 hours. Then the mixture is cooled to 20° C. and decomposed with 50 parts of 2-N hydrochloric acid, filtered, made alkaline, and diluted to a total volume of 350 parts. After cooling at 0° C. for 8 hours, the precipitate formed is filtered and recrystallized from diisopropyl ether by chilling at —20° C. to yield the white amorphous powder of 1-phenyl-3-[4-(2-pyrimidyl)-piperazine]-1- propanol melting at about 94–95.4° C.

*Example 10*

A mixture of 5.45 parts of γ-chlorobutyrophenone and 10.7 parts of 1-(4-methyl-2-pyrimidyl)piperazine is heated at 105° C. for 5 hours and cooled. The mixture is then treated with water and ether. The ether layer is separated and dried over sodium sulfate and filtered. After cooling at —20° C. the precipitate is collected. The powder of 1-(γ-benzoylpropyl)-4-(4-methyl-2-pyrimidyl)-piperazine thus obtained melts at about 62.4–63.2° C.

To a solution of 2 parts of 1-(γ-benzoylpropyl)-4-(4-methyl-2-pyrimidyl)piperazine in 80 parts of absolute ethanol, is added 0.3 part of sodium borohydride at 35° C. and the stirring continued for 2 hours. The mixture is decomposed by the portionwise addition of 80 parts of 2-N hydrochloric acid at 20° C., made alkaline with dilute sodium hydroxide, and diluted to a total volume of 1,000 parts. After extraction with ether, the organic layer is dried and evaporated to leave an oil which is dissolved in diisopropyl ether. This mixture is allowed to stand at —15° C. until a precipitate forms. This is filtered and dried to yield the white amorphous powder of 1-phenyl-4-[4-(4-methyl-2-pyrimidyl)piperazine]-1-butanol melting at about 78.5–80° C. The compound has the structural formula

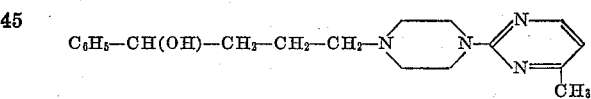

What is claimed is:
1. A compound of the structural formula

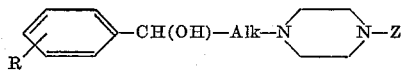

wherein Alk is a lower alkylene radical; R is a member of the class consisting of hydrogen, methyl, methoxy and fluoro radicals; and Z is a member of the class consisting of pyridyl, methylpyridyl, pyrimidyl, and methylpyrimidyl radicals.

2. A compound of the structural formula

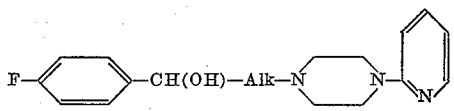

wherein Alk is a lower alkylene radical.

3. 1-(4-fluorophenyl)-4-[4-(2 - pyridyl)piperazine]-1-butanol.

4. 1-(4-methoxyphenyl)-3-[4-(4-methyl - 2 - pyridyl)-piperazine]-1-propanol.

5. 1-(4-methylphenyl)-4-[4-(2 - pyridyl)piperazine]-1-butanol.

6. A compound of the structural formula
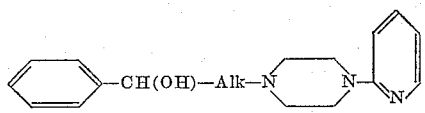
wherein Alk is a lower alkylene radical.
7. 1-(4-fluorophenyl)-3-[4-(4 - methyl-2-pyridyl)piperazine]-1-propanol.
8. 1-(4-methoxyphenyl)-3-[4-(4-methyl - 2 - pyridyl)-piperazine]-1-propanol.
References Cited in the file of this patent
UNITED STATES PATENTS
| | | |
|---|---|---|
| 2,543,972 | Hultquist et al. | Mar. 6, 1951 |
| 2,562,036 | Hultquist et al. | July 24, 1951 |